United States Patent [19]

LeBrasse et al.

[11] 3,955,936
[45] May 11, 1976

[54] HEAVY-DUTY ALUMINUM BEARING ALLOY

[75] Inventors: Gordon J. LeBrasse; Austin H. Beebe, Jr., both of Ann Arbor, Mich.

[73] Assignee: Federal-Mogul Corporation, Southfield, Mich.

[22] Filed: Feb. 13, 1974

[21] Appl. No.: 442,064

[52] U.S. Cl. ............................... 29/197; 29/196.2; 75/144
[51] Int. Cl.² ........................................ B32B 15/20
[58] Field of Search ............... 29/197, 197.5, 196.2; 75/144

[56] References Cited
UNITED STATES PATENTS

| | | | |
|---|---|---|---|
| 2,215,445 | 9/1940 | Vaders | 29/197 |
| 2,760,860 | 8/1956 | Gallatin et al. | 29/197 |

*Primary Examiner*—R. Dean
*Attorney, Agent, or Firm*—Harness, Dickey & Pierce

[57] ABSTRACT

A heavy-duty aluminum-base bearing alloy capable of being continuously cast and rolled into strip stock and comprised of about 2.5% to about 3.5% cadmium, about 1.0% to about 1.5% copper, about 0.75% to about 1.25% nickel, about 1.25% to about 1.75% manganese, and the balance consisting essentially of aluminum, along with incidental impurities and residuals present in the usual amounts. The invention further encompasses composite bearing materials and the method of fabricating such composite bearing materials and components consisting of a hard metal backing strip, such as steel, to which a lining of the bearing alloy is tenaciously bonded.

4 Claims, No Drawings

HEAVY-DUTY ALUMINUM BEARING ALLOY

BACKGROUND OF THE INVENTION

The present invention is particularly applicable but not necessarily limited to bearing alloys as well as composite bearing materials of the type suitable for fabricating bearing components for use in high performance reciprocating internal combustion engines. A typical heavy-duty aluminum bearing alloy of the type heretofore employed for such bearing materials is disclosed in U.S. Pat. No. 2,760,860, granted Aug. 28, 1956, for "Bearing Alloy", which is assigned to the same assignee as the present invention. In addition to the bearing alloy described in the aforementioned U.S. patent, various alternative aluminum alloys have heretofore been used or proposed for use in the fabrication of bearing components adapted for heavy-duty use, such as for use as connecting rods and main bearings of internal combustion engines, including diesel engines, as well as thrust washers, bushings and plain and flanged sleeve bearings in other sections of the engine and drive train components of vehicle drive systems.

The increasing severity of operating conditions to which bearings of the foregoing type are being subjected as a result of design innovations for increasing the performance and efficiency of internal combustion engines has in some situations occasioned a premature failure of prior art bearing alloys. Attempted modifications of such alloys to improve their physical strength properties and fatigue resistance, even including special heat treatments of the bearing component after forming operations, has heretofore been unsuccessful due to the detrimental effects of such alterations on other desirable and necessary properties including the bearings lining's resistance to corrosion, cavitation and wear, and its slipperiness, embeddability and conformability properties. Manufacturing considerations, including the capability of the alloy to be continuously cast and rolled into strip stock without incurring segregation and/or hot shortness and the ability to subsequently roll bond the bearing strip stock to a hard metal backing strip, are also necessary characteristics of a commercially acceptable bearing alloy.

The present invention overcomes the problems and disadvantages of prior art type aluminum bearing alloys by a controlled modification in the amounts and types of alloying constituents providing therewith a synergistic effect, whereby a substantial improvement in the fatigue resistance and tensile strength properties of the bearing alloy is achieved without any sacrifice in the other desirable and necessary characteristics of the bearing material and its capacity to be produced and fabricated into bearing components employing conventional mass-production manufacturing techniques without requiring any special heat treatments.

SUMMARY OF THE INVENTION

The benefits and advantages of the present invention are achieved by an aluminum bearing alloy containing, as its essential alloying constituents, about 2.5% to about 3.5% cadmium, about 1.0% to about 1.5% copper, about 0.75% to about 1.25% nickel, about 1.25% to about 1.75% manganese, and the balance consisting essentially of aluminum along with incidental impurities and residuals present in usual amounts. The manganese, in combination with the copper and nickel alloying constituents, imparts an unexpected increase in the tensile strength, yield strength, fatigue resistance and the hardness of the bearing material, while at the same time provides excellent resistance to corrosion and wear, and excellent slipperiness, embeddability and conformability properties.

The invention further contemplates the fabrication of composite or bimetallic strips comprising a hard metal backing strip, such as steel, to one or both face surfaces of which a lining of the bearing alloy is tenaciously bonded. In accordance with the method aspects of the present invention, the composite bearing material is produced by superimposing a strip of the aluminum bearing alloy on a strip of steel, the opposed faces of which have been precleaned, preheating the assembly to an elevated temperature of from about 600°F to about 800°F, and thereafter applying pressure such as by rolling to effect a reduction in the thickness of the aluminum alloy strip of from about 40% to about 75% and simultaneously achieving a solid phase welding or bonding of the two strips into a unitary assembly. The resultant bimetallic strip can readily be cut, blanked, stamped and formed in accordance with conventional manufacturing practices into plain and flanged bearings and bushings of the desired size and configuration. The bearing faces of the resultant bearing components are preferably provided with a metallic overplating such as tin, lead, copper, indium, and alloys thereof, such as a lead-tin-copper alloy, for example, to enhance break-in and heavy-duty performance.

Additional benefits and advantages will become apparent upon a reading of the description of the preferred embodiments and the specific examples provided.

DESCRIPTION OF THE PREFERRED EMBODIMENTS

The various constituents and their relative proportions as herein described and as set forth in the subjoined claims are defined in terms of percentages by weight unless clearly indicated to the contrary.

The aluminum bearing alloy comprises about 2.5% to 3.5% cadmium, about 1.0% to about 1.5% copper, about 0.75% to about 1.25% nickel, about 1.25% to about 1.75% manganese, and the balance consisting essentially of aluminum together with the usual impurities and residuals present in conventional amounts. In accordance with a preferred embodiment, the aluminum bearing alloy nominally contains about 3.0% cadmium, about 1.25% copper, about 1.0% nickel, about 1.5% manganese, and the balance aluminum and incidental impurities and residuals.

The cadmium constituent imparts lubricity and slipperiness to the bearing alloy in order to provide the desired antifriction properties. Amounts of cadmium less than about 2.5% have been found to provide inadequate lubricity, whereas amounts greater than about 3.5% result in segregation and hot-shortness, detracting from the ability of making continuous castings of the aluminum bearing alloy.

The copper and nickel constituents impart hardness and strengthening to the alloy. Amounts of copper and nickel less than the minimum specified result in inadequate hardness, toughness and tensile strength in the resultant alloy, whereas amounts of these two constituents in excess of the maximum values specified result in excessive hardness and brittleness, detracting from the bearing characteristics of the material, while at the same time increasing the difficulty of working the alloy and fabricating bearing components therefrom.

The manganese constituent in combination with the copper and nickel constituents contributes to an unexpected improvement in the mechanical properties and fatigue resistance of the bearing alloy and when used within the limits of about 1.25% to about 1.75%, does not detract from the other desirable bearing characteristics of the alloy. Amounts of manganese generally less than about 1.25% have been found to impart inadequate tensile strength and fatigue resistance in the alloy; whereas amounts in excess of about 1.75% cause a reduction in hardness, tensile strength, and fatigue resistance of the alloy, and also causes segregation and nonuniformity of the alloy during a continuous casting thereof. The manganese constituent is preferably added as an aluminum-manganese prealloyed hardening agent.

In addition, the alloy can contain incidental impurities and conventional residuals present in amounts ordinarily encountered in commercial grades of the alloying constituents and which do not adversely effect the desirable bearing properties of the alloy. Of the conventional impurities and residuals present, iron is perhaps the most prevalent and can be tolerated in amounts up to about 0.5%, and preferably, less than about 0.3%. Quantities of iron substantially in excess of about 0.5% causes a reduction in the frictional characteristics of the alloy due to the formation of undesirable hard spots in the bearing lining which contribute to excessive shaft wear. An excessive amount of iron also contributes toward segregation of the alloy during continuous casting.

A particularly satisfactory bearing alloy suitable for use in heavy-duty operation nominally comprises 3% cadmium, 1.25% copper, 1% nickel, 1.5% manganese, with the balance consisting essentially of aluminum plus incidental impurities and conventional residuals and a maximum of 0.3% iron. The foregoing bearing alloy, after casting and rolling, is annealed by heating to a temperature of about 900°F for a period of one hour, and thereafter slowly cooled. Generally temperatures of about 750°F to about 950°F and time periods of about one-half to about three hours can be used during the annealing treatment. The resultant annealed strip has nominal physical properties including a hardness of 59, as measured on a Rockwell scale (R15T); a tensile strength of 28,000 psi; a yield strength of 10,500 psi; and an elongation of 26%. The resultant alloy strip was subsequently roll bonded to a hard metal backing strip employing a roll bonding procedure as hereinafter to be described, and the resultant lining as a result of the work hardening to which it was subjected, increased in hardness to 75 R15T; had a tensile strength of 36,000 psi; a yield strength of 34,000 psi and an elongation of 5%.

While the aluminum bearing alloy has utility when employed by itself in the fabrication of various bearing types, particularly satisfactory results are achieved when the alloy is employed in the form of a lining on the face of a hard metal backing strip, such as a mild steel strip. Typically, the steel strip can comprise SAE 1010 type as well as SAE 1020 and 1030 or the like. The bonding of the aluminum bearing alloy to the face of the backing material can be achieved by any one of a variety of techniques, of which the continuous roll bonding method as described in U.S. Pat. No. 3,078,563, granted Feb. 26, 1963, for "Method of Bonding Aluminum to Steel by Roll Pressure", constitutes a preferred technique. In accordance with the process as described in the aforementioned United States patent, which is assigned to the same assignee as the present invention and the contents of which are incorporated herein by reference, the aluminum strip and the hard metal backing strip are disposed with their clean opposed faces positioned in superimposed relationship and are preheated to an elevated temperature prior to passage between a roll assembly. The rolling operation effects a concurrent reduction in thickness and solid phase welding of the two strips into an integral material. In accordance with the roll assembly disclosed in the aforementioned United States patent, the pressure exerted on the outer surface of the aluminum strip is substantially greater than that imposed on the steel strip, thereby minimizing a work hardening of the steel backing strip, while at the same time assuring a reduction in the aluminum strip of at least about 40% and preferably from about 50% up to about 75% and even greater. Particularly satisfactory results are achieved with the present bearing alloy when the two superimposed strips are preheated to a temperature of about 600°F to about 800°F as they enter the compaction roll assembly.

In order to assure a tenacious and uniform bond across the entire interface between the aluminum and steel strips, the surfaces are preliminarily cleaned, such as by solvent degreasing followed by wire brushing, sanding and/or acid pickling, to remove any scale and deleterious oxides and other contaminating substances which interfere with a diffusion bonding of the two strips. Particularly satisfactory results are obtained by subjecting the steel strip after solvent degreasing to a sulfuric acid etching treatment while anodically charged which can be followed, if desired, by a plating of one face surface of the steel strip to avoid subsequent corrosion prior to the roll bonding operation. Nickel platings have been found particularly satisfactory when such platings are employed.

The resultant composite or bimetallic strip without further treatment can be subjected to conventional stamping, blanking, forming and cutting operations in order to fabricate bearing components of the desired size and configuration. The resultant bearing components are preferably subjected to a final machining operation in which the face surface of the aluminum bearing lining is accurately sized, whereafter an overplating of a soft bearing metal, such as tin, lead, copper, indium, as well as alloys thereof, for example, is applied in amounts generally ranging from as little as several ten-thousandths of an inch up to several thousandths of an inch.

Accelerated laboratory engine testing of connecting rod bearings fabricated from the composite bearing material of the present invention nominally comprised of 3% cadmium, 1.25% copper, 1% nickel, 1.5% manganese, and the balance consisting essentially of aluminum having an overplate of a lead-tin-copper alloy (SAE 19) of a thickness of one to two ten-thousandths inch were observed to possess excellent slipperiness and resistance to corrosion, fatigue and wear, while at the same time exhibiting good embeddability and conformability characteristics. Bearings of the foregoing type exhibited superior performance and endurance in comparison to bearings fabricated from alternative aluminum bearing alloys of the types heretofore employed when subjected to the identical test conditions.

While it will be apparent that the invention herein disclosed is well calculated to achieve the above described benefits and advantages, it will be appreciated that the invention is susceptible to modification, variation and change without departing from the spirit thereof.

What is claimed is:

1. A composite heavy-duty bearing material possessed of improved fatigue resistance comprising a high-strength backing strip having a bearing lining tenaciously bonded to at least one face surface thereof, said bearing lining consisting essentially of about 2.5% to about 3.5% cadmium, about 1.0% to about 1.5% copper, about 0.75% to about 1.25% nickel, about 1.25% to about 1.75% manganese, and the balance aluminum including incidental impurities and residuals present in conventional quantities.

2. The composite bearing material as defined in claim 1, in which said bearing lining consisting essentially of about 3.0% cadmium, about 1.25% copper, about 1.0% nickel, about 1.5% manganese, up to about 0.5% iron and the balance aluminum together with incidental impurities and residuals present in conventional quantities.

3. A heavy-duty bearing component possessed of improved fatigue resistance comprising a high-strength backing material having a bearing lining tenaciously boned to at least one face thereof, said lining comprised of a bearing alloy consisting essentially of from about 2.5% to about 3.5% cadmium, about 1.0% to about 1.5% copper, about 0.75% to about 1.25% nickel, about 1.25% to about 1.75% manganese and the balance aluminum together with incidental impurities and residuals present in conventional quantities.

4. A heavy-duty bearing component as defined in claim 3, in which said lining consists essentially of about 3.0% cadmium, about 1.25% copper, about 1.0% nickel, about 1.5% manganese, up to about 0.5% iron with the balance consisting essentially of aluminum and incidental impurities and residuals present in conventional quantities.

* * * * *